United States Patent
Cosgrave et al.

(10) Patent No.: US 11,740,104 B2
(45) Date of Patent: Aug. 29, 2023

(54) APPARATUS FOR DETECTING SENSOR ERROR

(71) Applicant: Analog Devices International Unlimited Company, County Limerick (IE)

(72) Inventors: Gavin Patrick Cosgrave, Enniscorthy (IE); Jeremy Gorbold, Newbury (GB); Robert Guyol, St. Louis, MO (US); James Stegen, Chicago, IL (US)

(73) Assignee: Analog Devices International Unlimited Company, Limerick (IE)

( * ) Notice: Subject to any disclaimer, the term of this patent is extended or adjusted under 35 U.S.C. 154(b) by 458 days.

(21) Appl. No.: 16/928,930

(22) Filed: Jul. 14, 2020

(65) Prior Publication Data
US 2022/0018687 A1    Jan. 20, 2022

(51) Int. Cl.
*G01P 3/487*    (2006.01)
*G01D 5/16*    (2006.01)
*G01B 7/30*    (2006.01)

(52) U.S. Cl.
CPC ................ *G01D 5/16* (2013.01); *G01B 7/30* (2013.01)

(58) Field of Classification Search
CPC ........ G01B 7/30; G01D 5/145; G01D 5/24485
See application file for complete search history.

(56) References Cited

U.S. PATENT DOCUMENTS

| 9,638,762 | B2 | 5/2017 | Scherr |
| 9,664,768 | B2 | 5/2017 | Furuichi et al. |
| 9,733,107 | B2 | 8/2017 | Zimmer et al. |
| 10,156,461 | B2 * | 12/2018 | Snyder .................. G01D 18/00 |
| 10,267,870 | B2 * | 4/2019 | Cosgrave ............. G01R 33/096 |

(Continued)

FOREIGN PATENT DOCUMENTS

| CN | 110081914 | 8/2019 |
| EP | 3 415 870 | 12/2018 |

OTHER PUBLICATIONS

Analog Devices: Integrated AMR Angle Sensor and Signal Conditioner, www.analog.com, 2014, pp. 1-21.

(Continued)

*Primary Examiner* — Muhammad S Islam
(74) *Attorney, Agent, or Firm* — Knobbe, Martens, Olson & Bear, LLP

(57) ABSTRACT

A magnetic angle measurement system having magnetic angle sensors, signal processing circuitry and a processor is disclosed. First signal processing circuitry receives a first subset of outputs of a first plurality of outputs from a first magnetic angle sensor and determines first magnetic angle data based on the received first subset of outputs. Second signal processing circuitry receives a second subset of the outputs from the first magnetic angle sensor and determines second magnetic angle data based on the received second subset of outputs. Third signal processing circuitry receives a second plurality of outputs from the second magnetic sensor and determines third magnetic angle data based on the received second plurality of outputs. The processor compares the magnetic angle data and determines a processing result based on the comparison, where fault tolerance resolution of the magnetic angle measurement system is based at least in part on the processing result.

20 Claims, 9 Drawing Sheets

(56) References Cited

U.S. PATENT DOCUMENTS

| | | | |
|---|---|---|---|
| 10,309,803 B2* | 6/2019 | Cosgrave | G01D 5/24461 |
| 10,557,724 B1* | 2/2020 | Bhattacharyya | G01R 33/093 |
| 2016/0245677 A1* | 8/2016 | Cosgrave | G01D 5/24461 |
| 2016/0245893 A1 | 8/2016 | Cosgrave et al. | |
| 2017/0356765 A1 | 12/2017 | Watanabe et al. | |

OTHER PUBLICATIONS

Guyol, Robert, "Analog Devices: Application Note AN-1314," 2014, pp. 1-10.

International Search Report and Written Opinion dated Oct. 14, 2021 in application No. PCT/EP2021/069084.

* cited by examiner

APPARATUS FOR DETECTING SENSOR ERROR

CROSS-REFERENCE TO RELATED APPLICATIONS

This application is related to U.S. Pat. No. 10,309,803, filed Feb. 19, 2016, entitled "Detecting Sensor Error," the entirety of which is hereby incorporated herein by reference.

FIELD OF DISCLOSURE

The disclosure relates to sensors and, more specifically, to apparatus and methods for detecting sensor errors through various combinations of sensing elements.

BACKGROUND

Magnetic sensors can be implemented to obtain linear or circular position or angle information of a mechanical component, such as a shaft, in various applications, including an automotive steering system. Magnetic sensing elements used in magnetic angle sensors often suffer from changing sensitivity levels and nonlinearity errors due to, for example, temperature change, and it is desirable to implement sensor error detection mechanism for magnetic sensors.

SUMMARY

The methods and devices of the described technology each have several aspects, no single one of which is solely responsible for its desirable attributes.

In one aspect, there is provided a magnetic angle measurement system. The magnetic angle measurement system comprises a first magnetic angle sensor, a second magnetic angle sensor, first signal processing circuitry, second signal processing circuitry, third signal processing circuitry, and a processor. The first magnetic angle sensor has a first plurality of outputs comprising a first subset of outputs and a second subset of outputs. The first subset of outputs is distinct from the second subset of outputs. The second magnetic angle sensor has a second plurality of outputs. The first signal processing circuitry is in a first signal processing path. The first signal processing circuitry is configured to receive the first subset of outputs from the first magnetic angle sensor and determine first magnetic angle data based on the received first subset of outputs. The second signal processing circuitry in a second signal processing path is configured to receive the second subset of outputs from the first magnetic angle sensor and determine second magnetic angle data based on the received second subset of outputs. The third signal processing circuitry in a third signal processing path is configured to receive the second plurality of outputs from the second magnetic sensor and determine third magnetic angle data based on the received second plurality of outputs. The processor is configured to compare the first, second, and third magnetic angle data and determine a processing result based on the comparison. Fault tolerance resolution of the magnetic angle measurement system is based at least in part on the processing result.

In an embodiment, determining the processing result comprises determining agreement between two of the first, second, and third magnetic angle data.

In an embodiment, the processing result comprises one of the two magnetic angle data in agreement.

In an embodiment, the first, second, and third signal processing paths are independent paths.

In an embodiment, the system further comprises fault detection circuitry configured to monitor the first, second, and third signal processing paths for faults.

In an embodiment, determining the processing result comprises determining no agreement between the first, second and third magnetic angle data and determining that the faults exist on two of the three signal processing paths.

In an embodiment, the processing result comprises the magnetic angle data from the processing path not having the fault.

In an embodiment, the system further comprises a third magnetic angle sensor, a fourth magnetic angle sensor, fourth signal processing circuitry, fifth signal processing circuitry, and sixth signal processing circuitry. The third magnetic angle sensor has a third plurality of outputs and a fourth magnetic angle sensor has a fourth plurality of outputs. The fourth signal processing circuitry in a fourth signal processing path is configured to determine fourth magnetic angle data based on a first subset of the third plurality of outputs from the third magnetic angle sensor. The fifth signal processing circuitry in a fifth signal processing path is configured to determine fifth magnetic angle data based on a second subset of the third plurality of outputs from the third magnetic angle sensor. The sixth signal processing circuitry in a sixth signal processing path is configured to determine sixth magnetic angle data based on the fourth plurality of outputs from the fourth magnetic sensor. The processor is further configured to determine the processing result based on the comparison and the fourth, fifth, and sixth magnetic angle data.

In an embodiment, determining the processing result comprises determining no agreement between the first, second and third magnetic angle data and determining that the fourth, fifth, and sixth magnetic angle data agree with one of the first, second and third magnetic angle data.

In an embodiment, the processing result comprises the one of the first, second and third magnetic angle data in agreement with the fourth, fifth, and sixth magnetic angle data.

In one aspect, there is provided a method for controlling a motor. First data is obtained from a first signal processing path, second data is obtained from a second signal processing path, and third data is obtained from a third signal processing path. The first and the second data are associated with a first sensor, the third data is associated with a second sensor that is different from the first sensor, and the first, second, and third signal processing paths are independent of each other. A first angle, a second angle, and a third angle are determined from the first, the second, and the third data, respectively. the first, second, and third angles; are compared with a processor. The motor is controlled based at least in part on the comparison.

In an embodiment, the controlling the motor based on the comparison comprises determining that two of the first, the second and the third angles match and controlling the motor using one of the two matching angles in response to the determining that two of the first, the second and the third angles match.

In an embodiment, the method further comprises monitoring the first, second, and third signal processing paths to detect errors and causing an indication of an active fault flag in response to detecting the error. The active fault flag is associated with the signal processing path having the detected error.

In an embodiment, the controlling the motor based on the comparison comprises determining that the first, second and third angles mismatch, determining that active fault flags are associated with two of the first, second, and third signal processing paths, and controlling the motor using the angle associated with the signal processing path not associated with the active fault flag in response to the determination that the active fault flag is associated with the two of the first, second, and third signal processing paths.

In an embodiment, the first sensor is an anisotropic magnetoresistive sensor and the second sensor is a tunneling magnetoresistive sensor.

In an embodiment, fourth data is obtained from a fourth signal processing path, fifth data is obtained from a fifth signal processing path, and sixth data is obtained from a sixth signal processing path. The fourth and the fifth data are associated with a third sensor, the sixth data is associated with a fourth sensor that is different from the third sensor, and the fourth, fifth, and sixth signal processing paths are independent of each other. A fourth angle, a fifth angle, and a sixth angle are determined from the fourth, the fifth, and the sixth data, respectively. The motor is controlled based on the comparison and the fourth, fifth, and sixth angles In an embodiment, controlling the motor comprises determining no agreement between the first, second and third angles and determining that the fourth, fifth, and sixth angles agree with one of the first, second and third angles.

In one aspect, there is provided a motor control system. The system is configured as part of a vehicle control system. The motor control system comprises a shaft in communication with a steering wheel of the vehicle; and a magnetic angle measurement system for determining rotation of the shaft for motor control. The magnetic angle measurement system comprises a first magnetic angle sensor, a second magnetic angle sensor, first signal processing circuitry, second signal processing circuitry, third signal processing circuitry, and a processor. The first magnetic angle sensor has a first plurality of outputs comprising a first subset of outputs and a second subset of outputs. The first subset of outputs is distinct from the second subset of outputs. The second magnetic angle sensor has a second plurality of outputs. The first signal processing circuitry is in a first signal processing path. The first signal processing circuitry is configured to receive the first subset of outputs from the first magnetic angle sensor and determine first magnetic angle data based on the received first subset of outputs. The second signal processing circuitry in a second signal processing path is configured to receive the second subset of outputs from the first magnetic angle sensor and determine second magnetic angle data based on the received second subset of outputs. The third signal processing circuitry in a third signal processing path is configured to receive the second plurality of outputs from the second magnetic sensor and determine third magnetic angle data based on the received second plurality of outputs. The processor is configured to compare the first, second, and third magnetic angle data and determine a processing result based on the comparison. Fault tolerance resolution of the magnetic angle measurement system is based at least in part on the processing result In an embodiment, determining the processing result comprises determining agreement between two of the first, second, and third magnetic angle data.

In an embodiment, the processing result comprises one of the two magnetic angle data in agreement.

BRIEF DESCRIPTION OF THE DRAWINGS

These drawings and the associated description herein are provided to illustrate specific embodiments of the invention and are not intended to be limiting.

DETAILED DESCRIPTION

Figure 1A:
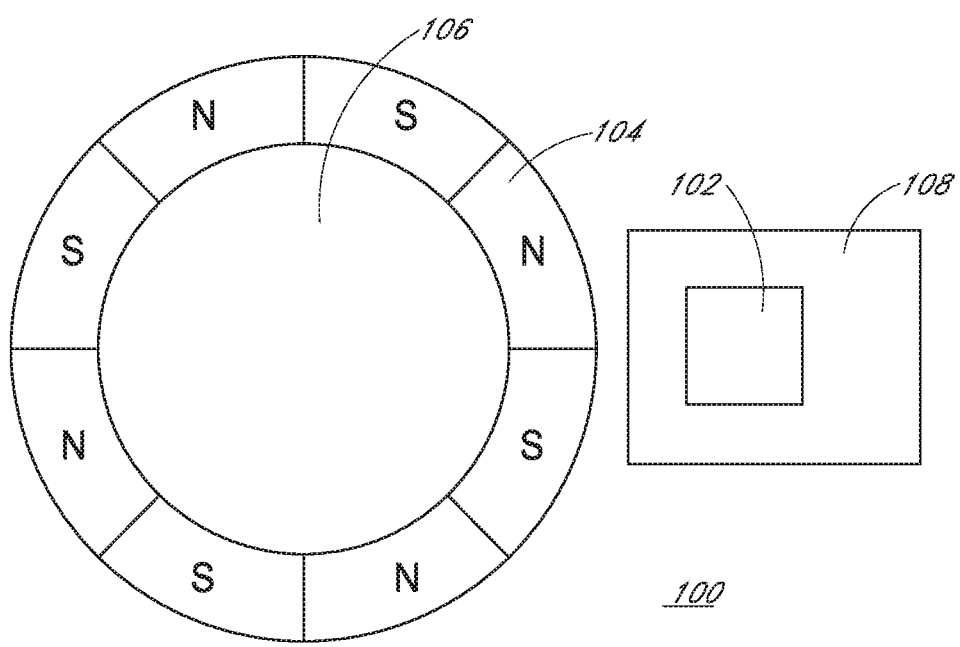
FIGS. 1A and 1B are a schematic diagram of an example implementation of an error detecting system according to certain embodiments.

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wired and wireless technologies, system configurations, networks, including optical networks, hard disks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Overview of Magnetic Field Turn Sensor System

Figure 1B:
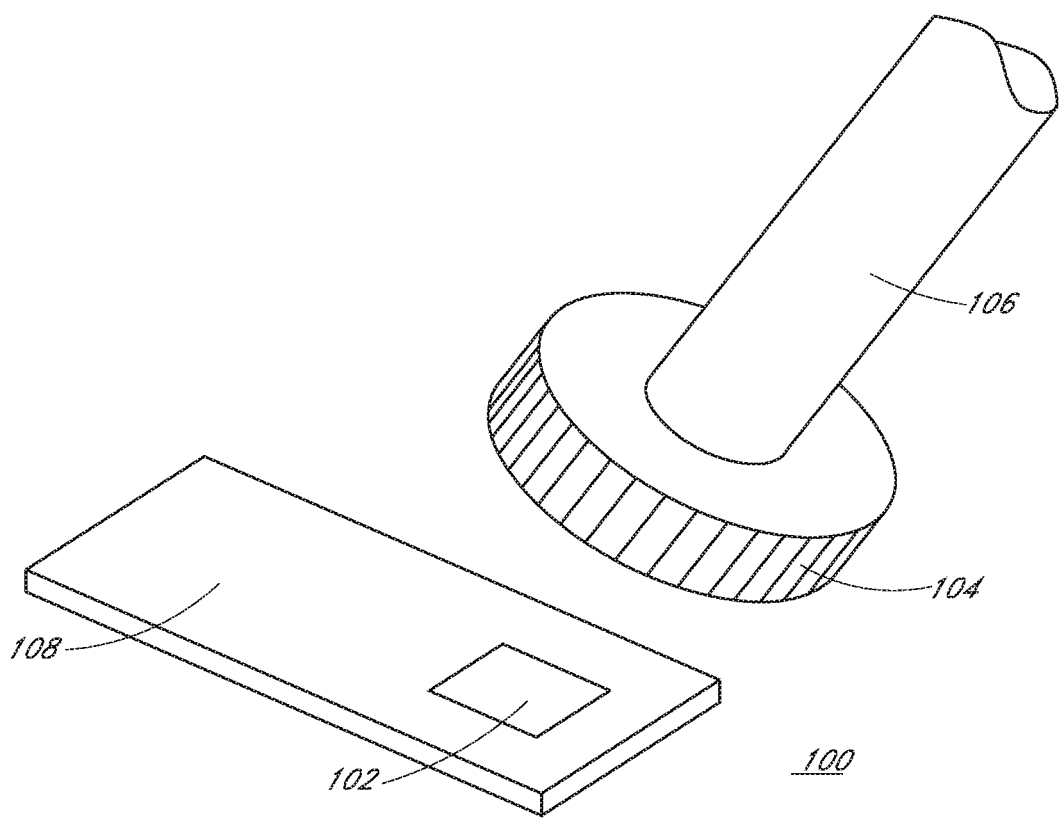

FIGS. 1A and 1B are schematic diagrams of example implementations of an error detecting system according to certain embodiments. The illustrated implementation 100 includes a shaft 106, a magnet 104, a sensing circuit 102 and a circuit board 108. Embodiments of the sensing circuit 102 are further described in connection with FIGS. 2A-2B below. The magnet 104 can be attached to the rotating shaft 106. The rotating shaft 106 can be associated with a steering wheel of a motor vehicle in certain implementations. The sensing circuit 102 can sense changes in position of the magnet 104 and provide an indication of rotation of the rotating shaft 106. A position relationship between the sensing circuit 102 and the magnet 104 illustrated in FIGS. 1A and 1B is for illustration purposes. In another embodiment, the implementation can use an end-of-shaft configuration where the magnet 104 can be a dipole magnet located at the end of the shaft 106 and the sensing circuit 102 can be located under the magnet 104. The position relationship can vary. In one embodiment, the sensing circuit 102 can comprise two sensors, i.e., a first sensor and a second sensor. The second sensor can be different from the first sensor. For example, the second sensor can use different sensing principle and different signal chain design to ensure robustness.

In embodiments, magnetic sensors such as anisotropic magnetoresistive (AMR) sensors, giant magnetoresistive (GMR), or tunneling magnetoresistive (TMR) sensors, or any other suitable magnetoresistive (XMR) sensors can be used to implement the disclosed apparatus and/or methods. In some embodiments, the magnetic sensors can measure the change in resistivity that is proportional to the magnetization direction of a free layer in the magnetoresistive sensor. By using magnetic sensors, such as AMR sensors and TMR sensors, and various combinations of sensing elements of the magnetic sensor, an error can be detected. For instance, embodiments described herein can overcome challenges related to sensor errors due to shorting of resistive sensing elements of AMR sensors, electrostatic discharge (ESD) leakage of output circuit(s), damages to one or more filters (e.g., electromagnetic compatibility (EMC) filter), gain errors, nonlinearity errors, the like, or any combination thereof.

In other embodiments, other types of sensors that obtain positional information from a differential sine and/or cosine output may be used to implement the error detection apparatus and methods described herein. For example, sensors such as a resolver, Hall Effect sensors, optical sensors, the like or any combination thereof may be used. Furthermore, the disclosure herein can provide self-checking of sensing error regardless of sensor variations due to temperature, for example.

In certain motor control applications, it is beneficial to monitor motor shaft angle of the shaft 106. Errors in shaft angle measurement can result in incorrect motor torque output. Therefore, it is important to ensure that the angle measurement result is true to the actual shaft angle, and that any errors in angle measurement are flagged to the motor control system. Further, in a motor control application, it is important that steering remain available. Thus, it is beneficial in the presence of a fault that the motor control system provides a valid measurement angle.

An example of a system for which it can be beneficial to monitor motor shaft angle of a shaft 106 is an automotive Electric Power Assisted Steering (ePAS) system in an automobile. In many ePAS systems, the shaft 106 angle is monitored as part of a motor control function when the system is normally operating. Previous diagnostics on angle measurement systems relied on comparing angle output from two sensors or from a single sensor have two measurement paths. If the reported angle measurements deviated significantly, the system shut down as it cannot determine which angle measurement is incorrect. To address this challenge, an angle measurement system (which can be included as a portion of the sensing circuit 102) can be configured to determine which angle measurement is incorrect.

The number of turns through which the motor shaft 106 has rotated may be a critical variable for certain vehicle functions. For example, errors in a turn count measurement for a steering wheel shaft can result in detection of an incorrect steering angle, which can lead to a hazardous situation. Therefore, it can be important to correctly measure the turn count, and flag any errors in angle measurement to the motor control system. Further, to maintain functionality, it is important to determine which angle measurement is incorrect and to which angle measurement can be relied upon to a valid measurement.

In the disclosure, the sensing circuit 102 can use angle measurements from multiple signal paths to determine discrepancies between the angle measurements. In an aspect, a second sensor and the inherent redundancy in a first sensor can be combined to allow the angle measurement system to determine which sensor has a failure in the event of a discrepancy between the first and second sensors' measured angle. Furthermore, in this disclosure, the second sensor can use a different sensing principle and different signal chain design to ensure robustness to common-cause failure events.

Aspects of this disclosure can be implemented in a magnetic angle sensor including, for example, the sensing circuit 102. Such a magnetic sensor can include AMR sensing elements and TMR sensing elements, signal conditioning electronics and an interface. In one application, the interface can be a peripheral acceleration sensor (PAS) interface, such as a PAS4, a serial peripheral interface (SPI), a single edge nibble transmission (SENT) interface, a peripheral sensor interface (PSI5), a low-voltage differential signaling (LVDS) interface, or an application binary interface (ABI) for remote accelerometers used for airbag deployment in vehicles, for communication with a host electronic control unit (ECU). The magnetic angle sensor can be implemented in an automotive ePAS system. Such a system has a functional safety specification defined in accordance with ISO-26262, which is a functional safety standard for road vehicles. The principles and advantages discussed herein can be implemented to detect errors in the angle measurements of the shaft 106 (e.g., which may be associated with a steering wheel) in an ePAS system to satisfy a functional safety specification. In other instances, the illustrated implementation 100 can be used in other systems complying with other specifications or standards, or systems requiring relatively low error in and/or robust cross-checking of angle sensing.

As described herein, the magnetic sensor typically includes two full bridges, e.g., a cosine bridge and a sine bridge. Each of the cosine bridge and the sine bridge outputs voltages, i.e., $V_{COS}$ and $V_{SIN}$, respectively. For example, in an AMR sensor using a single dipole magnet, "electrical angle" can be understood as the angle calculated from arctan($V_{SIN}/V_{COS}$), and "magnetic angle," that is expressed as $ANGLE_{MAG}$ herein, can be calculated by dividing the "electric angle" by two (2). For an AMR where the two bridges are rotated at approximately 45° from each other, the outputs of the two bridges are sinusoidal with a relative phase shift of approximately 90°, and the sensor's electrical response is twice the magnetic angle. In another example, for a TMR sensor, the "electric angle" can be same as the "magnetic angle." Further, "mechanical angle" can be understood as the angle determined based on the magnet design, which can be reflected in a mechanical-to-magnetic angle transfer function. The "mechanical angle" and "magnetic angle" can be the same or different from each other. For example, in certain embodiments using a single pole-pair magnet, the "mechanical angle" and "magnetic angle" are the same. However, in other embodiments, the "mechanical angle" and "magnetic angle" may be different, for example, if the magnetic zero angle is rotated relative to the desired mechanical zero-angle. In embodiments using a multi-pole magnet, such a pole-ring, the "mechanical angle" can be expressed as ($ANGLE_{MAG}/N$), where N is the number of pole pairs.

In some embodiments, the systems and methods disclosed herein may be applied to an apparatus having a rotating shaft, which may include one or more magnetic elements such as dipole or ring magnets. A measurement of the magnetic field by the sensing elements can be used to determine the angle of rotation of the shaft.

Examples of Magnetic Field Turn Sensor Systems and Error Detection Techniques

Figure 2A:
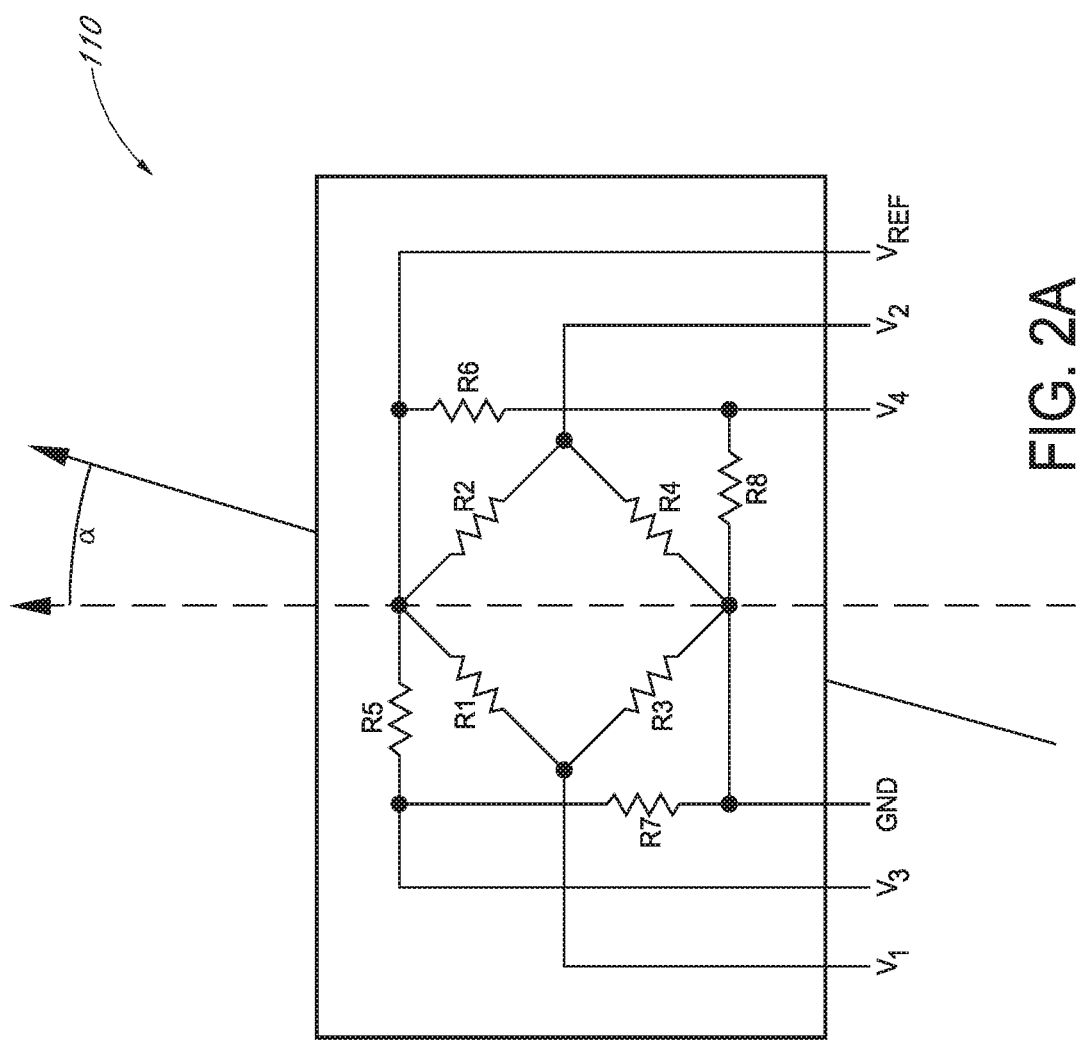
FIG. 2A is a schematic diagram of an example implementation of the sensing circuit according to certain embodiments.

FIG. 2A shows a diagram of example implementation of a first sensor 110 according to one embodiment. A first sensor 110 comprises one or more half bridges. Sensors 110 including two or more half bridges can be configured as one or more full bridges. The example first sensor 110 illustrated in FIG. 2A includes eight sensing elements R1-R8 that are configured as a system of four half bridges. As illustrated in FIG. 2A, the first sensor 110 includes sensing elements R1 and R3 forming a first half bridge having an output V1; sensing elements R2 and R4 forming a second half bridge having a second output V2; sensing elements R5 and R7 forming a third half bridge having an output V3; and sensing elements R6 and R8 forming a fourth half bridge having an output V4.

A plurality of half bridges (or full bridges which are paired half bridges) of the half bridge system can be oriented at an angle relative to one another and configured to be sensitive to magnetic fields in different directions. In FIG. 2A, the full bridge including sensing elements R1-R4 and the full bridge including sensing elements R5-R8 are oriented an angle α relative to each other. In the illustrated embodiment, α=approximately 45°. In an embodiment, each of the two-paired half bridges (which are full bridges) can form individual signal processing paths, i.e., first signal processing path and second signal processing path, each of which is a path between the first sensor and an interface. Here, one full bridge can correspond to a cosine bridge and the other bridge can correspond to a sine bridge. For example, the cosine bridge can comprise the sensing elements R1-R4, the sine bridge can comprise the sensing elements R5-R8, where V2−V1=$V_{COS}$ and V4−V3=$V_{SIN}$. One bridge of the sine and the cosine bridges can be included in the first signal processing path, which is a first path from the first sensor 110 to an interface. The other of the sine and cosine bridges can be included in the second channel, which is a second path from the first sensor 110 to the interface. The first path is different from the second path. In other embodiments, the system of half bridges may include more or fewer half bridges than the embodiment illustrated in FIG. 2A.

Figure 3:
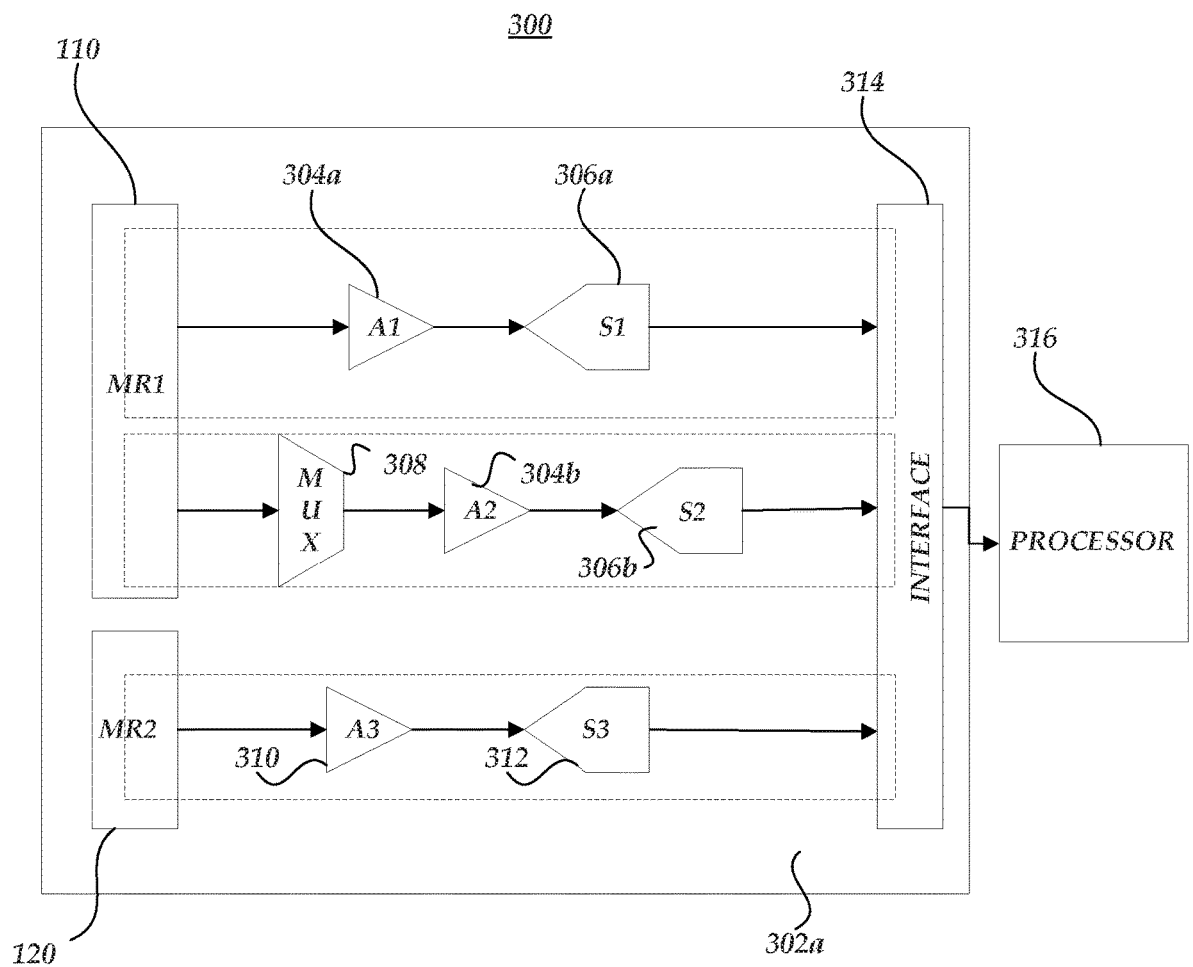
FIG. 3 is a block diagram of an example implementation that includes three signal processing paths according to certain embodiments.

FIG. 3 is a block diagram of an example implementation 300 of an error detector according to one embodiment. The illustrated implementation 300 can comprise a first sensor 110, a second sensor 120, an interface 314 and a processor 316. The first sensor 110 can be an AMR sensor and the second sensor 120 can be a TMR sensor.

A first signal processing path between the first sensor 110 and the interface 314 can comprise a first amplifier 304a and a first analog-to-digital converter 306a. The first signal processing path can comprise at least part of the interface 314. The first signal processing path can provide first data to the processor 316 over the interface 314. The first data can be associated with the first sensor 110. The first data can be associated with the combinations of half bridges illustrated in FIG. 2A. For example, the first signal processing path can provide angle measurement data from the first sensor 110 over the interface 314 to the processor 316.

A second signal processing path between the first sensor 110 and the interface 314 can comprise a multiplexer 308, a second amplifier 304b and a second analog-to-digital converter 306b. The second signal processing path can comprise at least part of the interface 314. The second signal processing path can provide second data to the processor 316 over the interface 314. The second data can be associated with the first sensor 110. The second data can be associated with another one of the combinations of half bridges illustrated in FIG. 2A. For example, the second signal processing path can independently measure a phase shifted angle from a different combination of first sensor outputs than are used to provide angle measurement data in the first signal processing path. The combination of first sensor outputs associated with the first signal processing path is distinct from the combination of first sensor outputs associated with the second processing path. The second signal processing path can provide the angle measurement data from the first sensor 110 over the interface 314 to the processor 316.

A third signal processing path between the second sensor 120 and the interface 314 can comprise a third amplifier 310 and a third analog-to-digital converter 312. The third signal processing path can comprise at least part of the interface 314. The third signal processing path can provide third data to the processor 316 over the interface 314. The third signal processing path data can be associated with the second sensor 120. The second sensor 120 can be different from the first sensor 110. The third signal processing path can be independent from the first and second signal processing paths. The third signal processing path can obtain a data for detecting an angle without sharing elements of the first and the second signal processing paths. For example, the third signal processing path can provide angle measurement data from the second sensor 120 over the interface 314 to the processor 316. In other aspects, the second sensor 120 can have a first and a second set of outputs and any of the circuitry and diagnostics described herein as associated with the first sensor 110 can be associated instead with the second sensor 120. In another aspect, both the first sensor 110 and the second sensor 120 can each be associated with a first and a second set of outputs and additional circuitry and diagnostics similar to the circuitry and diagnostics described herein as associated with the first sensor 110 can be associated with the second sensor 120.

The first sensor 110 and the second sensor 120 can be part of the sensing circuit 102 described above in connection with FIGS. 1A, 1B, 2A. The third signal processing path can alternatively be implemented with the multiplexer 322 as illustrated in FIG. 3B, which is described in further detail below. The first, the second, and the third signal processing paths can further include any other circuitry to process signals from the sensing circuit 102 in a single/multiple signal path to the processor 316. For example, the first, the second, and the third signal processing paths can comprise calibration circuitry 324a, 324b, 324c for calibrating outputs from the first and the second sensors 110, 120 as illustrated in FIG. 3B, which is described in further detail below. The implementation 300 can further comprise a bias circuit, a filter, a temperature sensor, a driver, etc. The implementation 300 can further include analog circuit elements to reduce computation by the processor 316. Although not illustrated in FIG. 3, signals from the first and the second sensors 110, 120 as described herein can be signals directly from the first and the second sensors 110, 120 or by way of one or more intervening circuit elements following the first and the second sensors 110, 120.

The interface 314 can comprise a serial peripheral interface (SPI). The signals from the first, second and third amplifiers 304a, 304b, and 310 can be transmitted to the processor 316 over the SPI. In an embodiment, the interface 314 can be any suitable interface standard that can send data and potential diagnostic information. In an embodiment, the interface 314 can be an on-chip interface such as AMBA bus or any other local bus interface. For illustration purposes, the interface 314 is shown as a single box. The interface 314 can comprise a plurality of interfaces and each of the first, the second and the third signal processing paths can comprise an individual interface.

The processor 316 computes angle(s) and/or radius(es). The processor 316 can compare the first data, the second data, and the third data, respectively, to detect whether there is a sensor error. In an embodiment, the processor 316 can include multiple processing elements, which can be co-located or separated (as illustrated in FIG. 3B). The processor 316 can comprise a memory configured to store instructions and calculated angle, radius, and data from the sensors 110, 120. The processor 316 can also perform any suitable computations to support the comparison. The third data can be data received from the third signal processing path or a value computed based on data received from the third signal processing path. The processor 316 in any of the illustrated embodiments can be implemented by a host electronic control unit (ECU) of an Electric Power Assisted Steering (ePAS) system, for example.

Figure 3A:
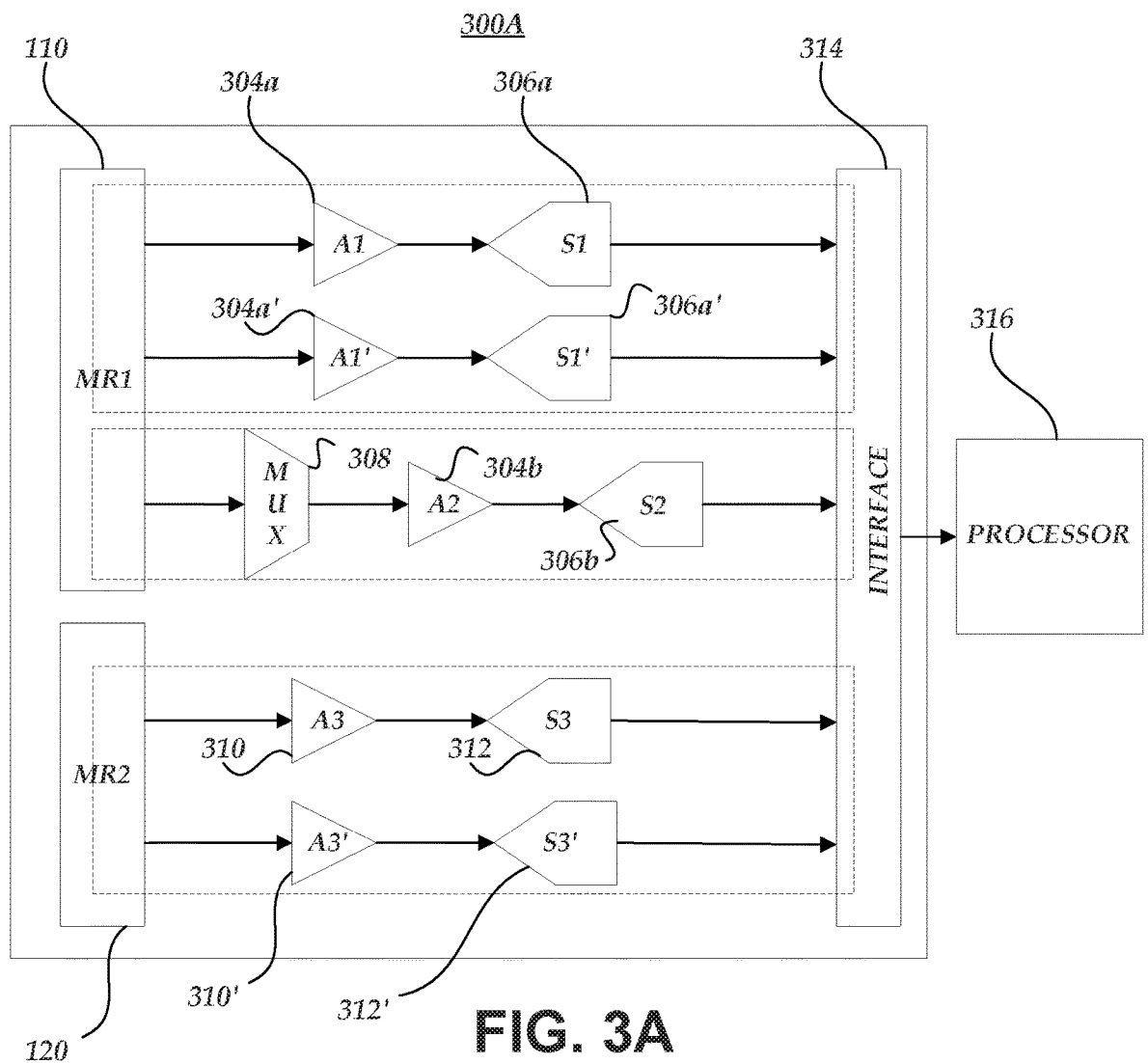
FIG. 3A is a block diagram of another example implementation that includes three signal processing paths according to certain embodiments.
Figure 3B:
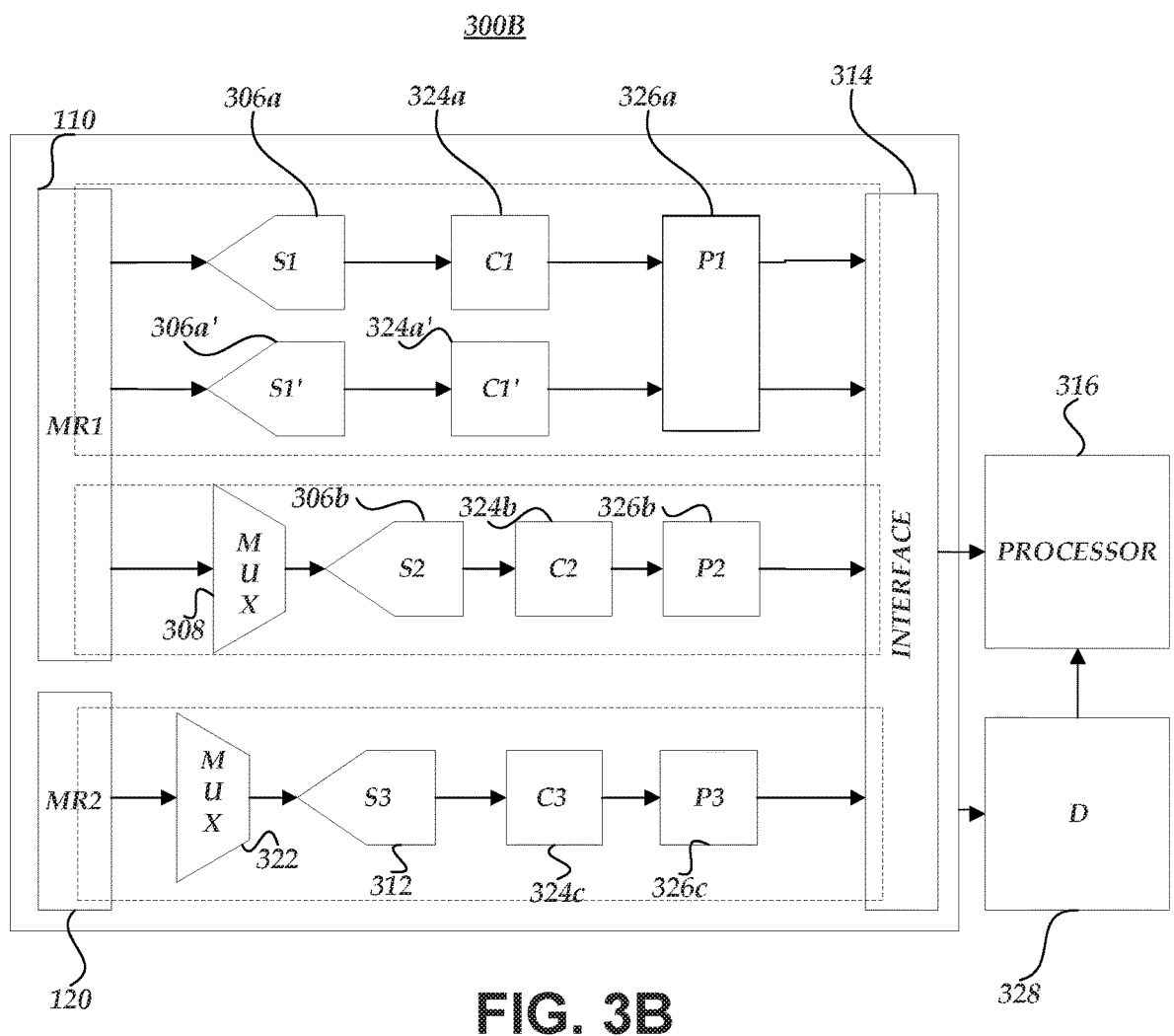
FIG. 3B is a block diagram of another example implementation that includes three signal processing paths according to certain embodiments.

FIG. 3A is a block diagram of another example implementation 300A that includes three signal processing paths according to certain embodiments. In an embodiment, the illustrated implementation 300A is similar to the illustrated implementation 300 except that the first signal processing path comprises a pair of first amplifiers 304a, 304a' and a pair of first analog-to-digital converters 306a, 306a', and the third signal processing path comprises a pair of third amplifiers 310, 310' and a pair of third analog-to-digital converters 312, 312'. The illustrated implementation 300A can comprise a first sensor 110, a second sensor 120, an interface 314 and a processor 316. The first sensor 110 can be an AMR sensor and the second sensor 120 can be a TMR sensor.

A first signal processing path between the first sensor 110 and the interface 314 can comprise the pair of first amplifiers 304a, 304a' and the pair of first analog-to-digital converters 306a, 306a'. The first signal processing path can comprise at least part of the interface 314. The first signal processing path can provide first data to the processor 316 over the interface 314. The first data can be associated with the first sensor 110. The first data can be associated with the combinations of half bridges illustrated in FIG. 2A. In an embodiment, the first data can comprise two sub-data from two combinations of two of four half bridge outputs of the first sensor 110 illustrated in FIG. 2A. For example, the two combinations of two of four half bridge outputs can comprise outputs from the cosine bridge comprising the sensing elements R1-R4 and the sine bridge comprising the sensing elements R5-R8 illustrated in FIG. 2A. Outputs from the cosine bridge of the first sensor 110 can pass through the first amplifier 304a and the first analog-to-digital converter 306a. Outputs from the sine bridge of the first sensor 110 can pass through the first amplifier 304a' and the first analog-to-digital converter 306a'.

A second signal processing path between the first sensor 110 and the interface 314 can comprise a multiplexer 308, a second amplifier 304b and a second analog-to-digital converter 306b. The second signal processing path can comprise at least part of the interface 314. The second signal processing path can provide second data to the processor 316 over the interface 314. The second data can be associated with the first sensor 110. The second data can be associated with another one of the combinations of half bridges illustrated in FIG. 2A. For example, the second signal processing path can independently measure a phase shifted angle from a different combination of first sensor outputs than are used to provide angle measurement data in the first signal processing path. The second signal processing path can provide the angle measurement data from the first sensor 110 over the interface 314 to the processor 316.

The third signal processing path between the second sensor 120 and the interface 314 can comprise the pair of third amplifiers 310, 310' and the pair of third analog-to-digital converters 312, 312'. The third signal processing path can comprise at least part of the interface 314. The third signal processing path can provide a third data to the processor 316 over the interface 314. The third data can be associated with the second sensor 120. The second sensor 120 can be different from the first sensor 110. The third signal processing path can be independent from the first and second signal processing paths. The third signal processing path can obtain a data for detecting an angle without sharing elements of the first and the second signal processing paths.

The first, second and third analog-to-digital converters 306a, 306a', 306b, 312 and 312' can each include, for example, a sigma-delta analog-to-digital converter, a successive approximation register (SAR) analog-to-digital converter, or the like. In an aspect, it can be advantageous for the analog-to-digital converters on the paths with multiplexors to use SAR analog-to-digital converters, as they can have a quicker settling time after changing channels. In other aspects, using different analog-to-digital converter types for the independent signal paths can increase robustness to common-cause failures. The first multiplexer 308 can receive four half bridge outputs from the first sensor 110 (i.e., first and second full bridges). The first multiplexer 308 may select one combination of the half bridge outputs that is different from the combination sent to the pair of first amplifiers 304a, 304a'. The first multiplexer 308 can receive at least three of the four half bridge outputs and select a combination of those outputs that is different from the combination sent to the pair of the first amplifiers 304a, 304a'. According to yet another embodiment, one of the differential inputs of the second amplifier 304b can receive a half bridge output and the other differential input of the second amplifier 304b can be electrically connected to a multiplexer arranged to select one of two or more half bridge outputs to provide to the other differential input of the second amplifier 304b.

FIG. 3B is a block diagram of another example implementation 300B that includes three signal processing paths according to certain embodiments. The implementation 300B of FIG. 3B can implement any of the principles and advantages of the circuits 300 of FIGS. 3 and 300A of FIG. 3A. The illustrated implementation 300B can comprise a first sensor 110, a second sensor 120, an interface 314 and a processor 316. The first sensor 110 can be an AMR sensor and the second sensor 120 can be a TMR sensor.

A first signal processing path between the first sensor 110 and the interface 314 can comprise a pair of first analog-to-digital converter 306a, 306a', a pair of the first calibration circuitry 324a, 324a' and a first processing circuitry 326a. In another embodiment, the first signal processing path can comprise one first calibration circuitry and one first processing circuitry.

The first signal processing path can comprise at least part of the interface 314. The first signal processing path can provide at least one of a first data, and a first angle calculated from the first data to the processor 316 over the interface 314. The first data can be associated with the first sensor 110. The first data can be associated with the combinations of half bridges illustrated in FIG. 2A. In an embodiment, the first data can comprise two sub-data from two combinations of two of four half bridge outputs of the first sensor 110 illustrated in FIG. 2A. For example, the two combinations of two of four half bridge outputs can comprise outputs from the cosine bridge comprising the sensing elements R1-R4 and the sine bridge comprising the sensing elements R5-R8 illustrated in FIG. 2A. Outputs from the cosine bridge of the first sensor 110 can pass through the first analog-to-digital converter 306a, the first calibration circuitry 324a, and a first processing circuitry 326a. Outputs from the sine bridge of the first sensor 110 can pass through the first analog-to-digital converter 306a', the first calibration circuitry 324a', and the first processing circuitry 326a.

The second signal processing path between the first sensor 110 and the interface 314 can comprise the first multiplexer 308, the second calibration circuitry 324b, a second analog-to-digital converter 306b, and a second processing circuitry 326b. The second signal processing path can comprise at least part of the interface 314.

A third signal processing path between the second sensor 120 and the interface 314 can comprise the second sensor 120, the second multiplexer 322, a third analog-to-digital converter 312, a third calibration circuitry 324c, and a third processing circuitry 326c. The third signal processing path can be independent from the first and second signal processing paths. In an embodiment where the third signal processing path is independent from the first signal processing path and the second signal processing path, the third signal processing path obtains data for detecting an angle without sharing elements of the first and the second signal processing paths. In another embodiment, the third signal processing path can comprise separated paths such as a pair of amplifiers and a pair of analog-to-digital converters as illustrated in FIG. 3A.

The first sensor 110 and the second sensor 120 can be part of the sensing circuit 102 described above in connection with FIGS. 1A, 1B, 2A. The first, the second and the third signal processing paths can further include any other circuitry to process signals from the sensing circuit 102 in a signal path to the processor 316.

The second multiplexer 322 can receive four half bridge outputs from the second sensor 120 (i.e., first and second full bridges). In an embodiment, the second multiplexer 322 may select one combination of the half bridge outputs. The second multiplexer 322 can receive at least three of the four half bridge outputs and select a combination of those outputs.

The first, the second, and the third calibration circuitry 324a, 324a', 324b, 324c can calibrate outputs from the first and the second sensors 110, 120. In an embodiment, the first, the second, and the third calibration circuitry 324a, 324a', 324b, 324c can be a functional signal path. The first, the second, and the third calibration circuitry 324a, 324a', 324b, 324c can be implemented by a state machine. The first, the second, and the third calibration circuitry 324a, 324a', 324b, 324c can correct errors in the sensors 110, 120 that can be caused by, for example, mechanical tolerances of the angle measurement system. The calibration can comprise a dynamic calibration and/or a single point calibration. For example, offset values are monitored and collected from overall waveform from each signal processing path. The collected offset is subtracted from the first, the second and the third data before calculating angle.

The example implementation 300B can further comprise diagnostic circuitry 328. The diagnostic circuitry 328 can be co-located with the first, the second and the third signal processing paths. The diagnostic circuitry 328 can monitor the calibration circuitry 324a, 324a', 324b, 324c and/or signal processing paths. In an embodiment, the diagnostic circuitry 328 can monitor the calibration circuitry 324a, 324a', 324b, 324c to ensure correct sequential operations. In an embodiment, the diagnostic circuitry 328 can detect error on the first, the second, and the third signal processing paths, respectively. The diagnostic circuitry 328 can inform the processor 316 of the error on a signal processing path via an active fault flag associated with each of the three signal processing paths. For example, the diagnostic circuitry 328 can detect a disconnection between the first and the second sensor 110, 120 and the processor 316. For example, the diagnostic circuitry 328 can detect if the signals from the first sensor 110, second sensor 120 to the processor 316 are outside of a normal operating range. In some embodiments, the diagnostics such as broken bond wire detection, short circuit detection, etc., can be used for detecting the error on the first, the second, and the third signal processing paths. In another embodiment, not illustrated, the diagnostic circuitry 328 can transmit diagnostic signals to the processor 316 via the interface 314 when the diagnostic circuitry 328 is co-located with the first, the second and the third signal processing paths. In an embodiment, the diagnostic circuitry 328 can be part of the processor 316. Thus, the processor 316 can monitor the error on the first, the second, and the third signal processing paths, respectively. In another embodiment, a memory can be checked for corruption.

In some embodiments, no more than two of the first, the second, and the third signal processing paths can share one or more circuitry. When error is detected from the shared circuitry, the processor 316 can determine that the data from the signal processing paths that include the shared circuitry is not reliable. For example, two of the first, the second, and the third signal processing paths can share a power supply or bias circuitry. When the power supply connected to the two signal processing paths goes out of range, the processor 316 can determine that the two signal processing paths sharing the power supply are not reliable and can determine that the other signal processing path is reliable.

The first, the second, and the third processing circuitry 326a, 326b, 326c can calculate angle(s) and/or radius(es) from outputs from the first, the second, and the third calibration circuitry 324a, 324a', 324b, 324c, respectively. For example, the first, the second, and the third processing circuitry 326a, 326b, 326c can comprise a processor including a coordinate rotation digital computer (CORDIC) algorithm. In one embodiment, the first, the second, and the third processing circuitry 326a, 326b, 326c can comprise processing circuitry to process the CORDIC algorithm. In other aspects, calibration circuitry can be positioned after the processing circuitry. For example, the first, the second, and the third calibration circuitry 324a, 324a', 324b, 324c can correct for sensor offset/amplitude errors by operating on the sensor outputs directly. The first, the second, and the third processing circuitry 326a, 326b, 326c can then convert the calibration circuitry outputs to an angle. In an aspect, additional calibration circuitry after the processing circuitry could correct for other errors, such as harmonics introduced by mechanical tolerances in the angle measurement system.

The angle and/or radius can be transmitted to the processor 316 over the interface 314 or other interconnection scheme. The outputs from the first, the second, and the third diagnostic circuitry 328 can be transmitted to the processor 316. The processor 316 can compare the calculated angles from the first, the second, and the third calibration circuitry 324a, 324a', 324b, 324c, respectively, to detect whether there is a sensor error. The processor 316 can also perform any suitable computations to support the comparison. In an embodiment, the first, the second, and the third signal processing paths can be integrated in an integrated circuit and the processor 316 can be implemented by a host electronic control unit (ECU) of an Electric Power Assisted Steering (ePAS) system, for example.

As described above, the first signal processing path reports angle measurement data from the first sensor 110, a second signal processing path independently measures a phase shifted angle from a different combination of first sensor outputs than are used to independently determine the angle measurement data in the first signal processing path, and a third signal processing path reports angle measurement data from the second sensor 120. These three (3) independent angle measurement data are reported over the interface 314 to the processor 316. The processor 316 can compare the angle measurements and determine which angle to use for motor control. Table 1 outlines an example decision process in the event of disagreement between the three independent sensor measurement data.

Figure 4:
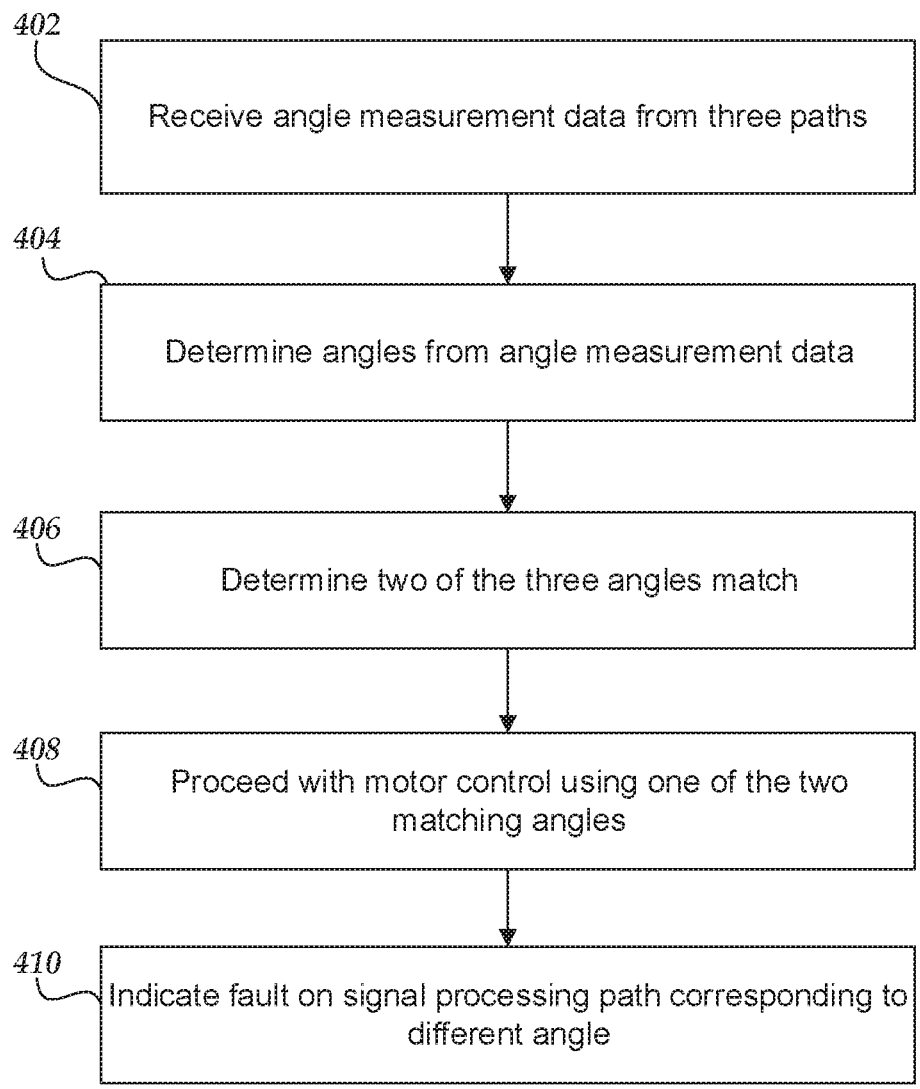
FIG. 4 is a flowchart of an example process of an error detection method according to certain embodiments.

In the event of disagreement between the three independent sensor measurement data, as found in scenarios 1-4 of Table 1, the processor 316 can implement the process illustrated in FIG. 4. FIG. 4 is a flowchart of an example process of an error detection method according to certain embodiments. The process can be performed with the circuit elements and the processor illustrated in FIGS. 2A, 3, 3A, 3B.

In block 402, angle measurement data are received from three signal processing paths. As illustrated above, three angle measurement data can be received through three signal processing paths, respectively.

In block 404, angles are determined from the angle measurement data. For example, a first angle from the first signal processing path, a second angle from the second signal processing path, and a third angle from the third signal processing path can be determined.

In block 406, processor 316 compares the first, the second, and the third angles to determine that two of the first, the second, and the third angles are matched. In an aspect, matching angles can be angles that match within a threshold. For example, angle values that are determined to be within a predetermined percentage of each other may be considered to be matching angles.

In block 408, a motor control proceeds with one of the two matching angles.

In block 410, a fault or error is indicated on a signal processing path corresponding to the angle that is different from the two matching angles.

When the processor 316 determines that the first, the second, and the third angles are matched, the motor control can proceed with one of the first, the second, and the third angles. When it is determined that all of the first, the second, and the third angles are not matched, it may not be possible to determine which angle to implement motor control without additional information.

In an aspect, instances of a single fault on any one path still allows the motor to proceed. Furthermore, the motor control can rely on the accuracy of the measured angle as it is reported independently by the two signal processing paths having matching angles. The process of FIG. 4 can implement a two out of three majority-voter system for measured angle validation from the system topology of FIG. 3, which advantageously achieves a three channel system with two sensors. There are numerous benefits in using the configuration of sensors and signal processing described above. By limiting the system to two sensors, there is a cost and manufacturing complexity reduction versus having three different sensors. Furthermore, the two sensors can be optimally placed under the rotating magnet so that both sensors see a more homogenous magnetic field.

TABLE 1

| Scenario | Angle Result | Cause | Action |
|---|---|---|---|
| 1 | Angle 1 = Angle 2 = Angle 3 | No fault present | Motor control proceeds using one of Angles 1-3 |
| 2 | Angle 1 = Angle 2<br>Angle 3 different | Fault on Path 3 | Motor control proceeds using one of Angles 1 and 2 |
| 3 | Angle 2 = Angle 3<br>Angle 1 different | Fault on Path 1 | Motor control proceeds using one of Angles 2 and 3 |
| 4 | Angle 1 = Angle 3<br>Angle 2 different | Fault on Path 2 | Motor control proceeds using one of Angles 1 and 3 |
| 5 | Angle 1, Angle 2, Angle 3 all different | At least 2 faults on 2 different paths. | Use additional information to determine motor control |

As described above, the motor angle measurement system can be further augmented by the addition of diagnostics on the electronic measurement paths of the first, second and third signal processing paths. For example, the state machines implementing the calibration can include state machine monitoring. In the event of an invalid state in any one of the three calibration state machines, the system can be informed via a set of fault flags associated with each of the three signal processing paths. The information from each of these fault flags can be used to augment the decision-making process. For example, if all three angles mismatch, the fault flag information can allow the motor control system to remain operational in a reduced functionality mode, by identifying if any of the three signal processing paths is free of fault flags. An example scenario is outlined in Table 2.

TABLE 2

| Scenario | Angle Result | Cause | Action |
| --- | --- | --- | --- |
| 5a | Angle 1, Angle 2, Angle 3 all different. Signal Path 1 no fault flags Signal Path 2 fault flags active Signal Path 3 fault flags active | No fault present on Signal Path 1 | Motor control proceeds using Angle 1 |
| 5b | Angle 1, Angle 2, Angle 3 all different. Signal Path 1 fault flags active Signal Path 2 no fault flags Signal Path 3 fault flags active | No fault present on Signal Path 2 | Motor control proceeds using Angle 2 |
| 5c | Angle 1, Angle 2, Angle 3 all different. Signal Path 1 fault flags active Signal Path 2 fault flags active Signal Path 3 no fault flags | No fault present on Signal Path 3 | Motor control proceeds using Angle 3 |

Figure 5:
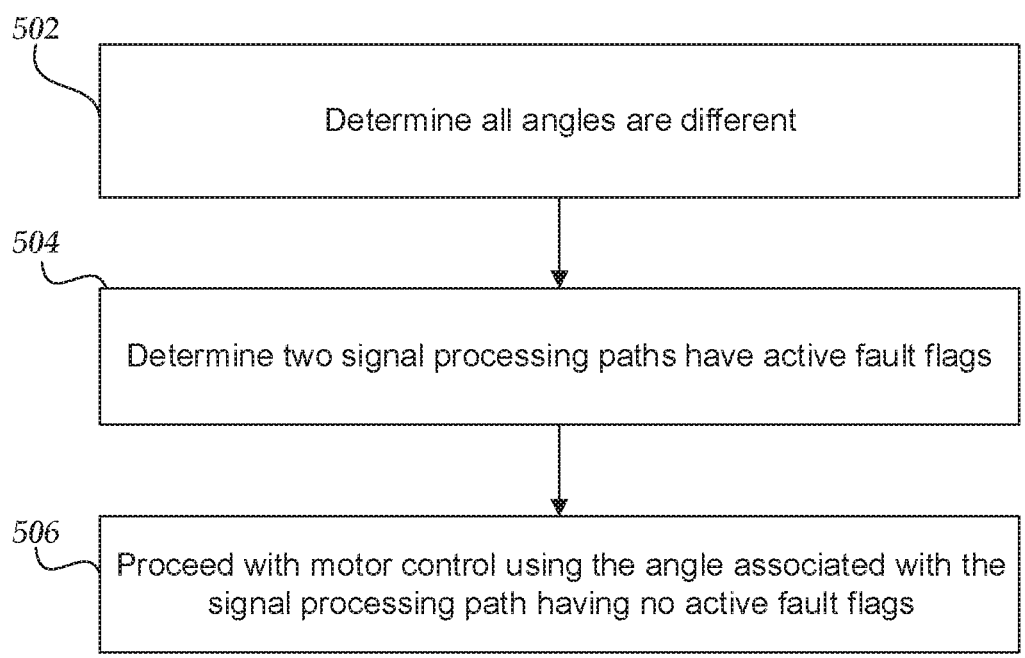
FIG. 5 is a flowchart of an example process of an error detection method according to certain embodiments.

In the event of no matching sensor measurement data, the processor 316 can implement the process illustrated in FIG. 5. FIG. 5 is a flowchart of an example process of an error detection method according to certain embodiments. The process can be performed with the circuit elements and the processor illustrated in FIGS. 2A, 3, 3A, 3B.

In block 502, the processor 316 determines that the first, the second, and the third angles are different from one another. In block 504, the processor 316 determines that the two of the three signal processing paths have an active fault flag. The active fault flag can be set by the diagnostic circuitry 328 and the processor 316. In block 506, the motor control proceeds using the angle associated with the signal processing path having no active fault flag.

Figure 6:
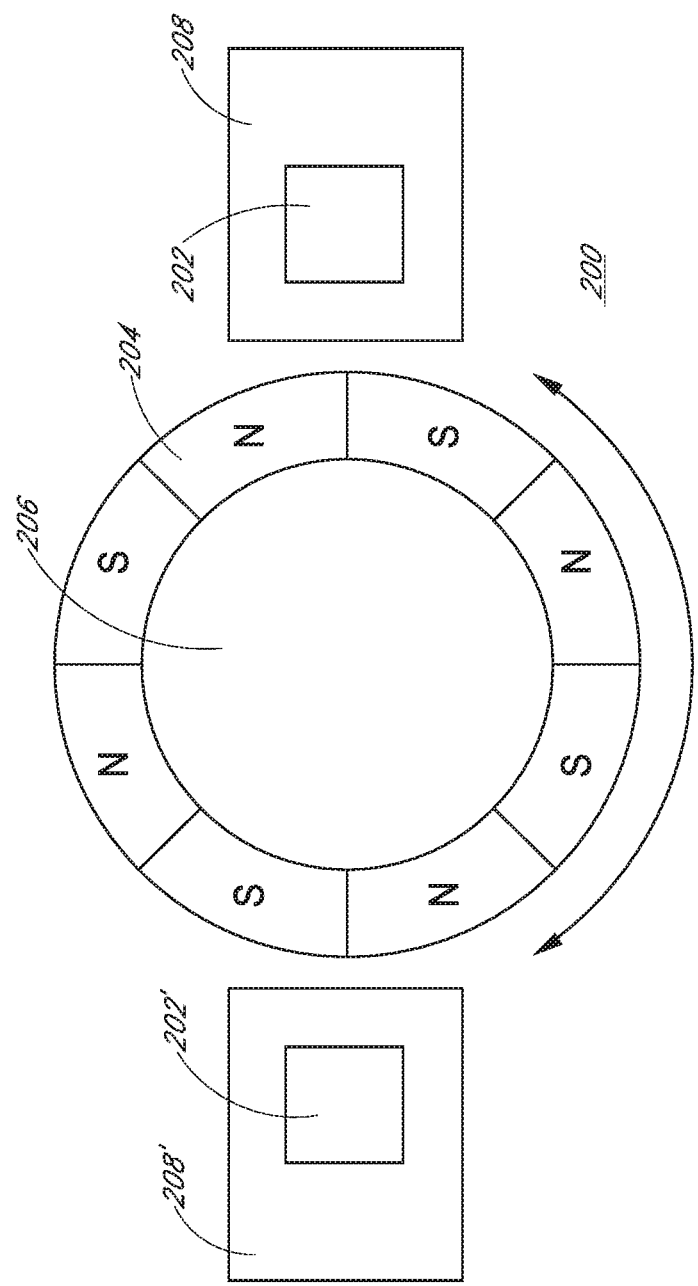
FIG. 6 is a schematic diagram of an example implementation of another error detecting system according to certain embodiments.

FIG. 6 is a schematic diagram of an example implementation 200 of another error detector system the according to certain embodiments. The illustrated implementation 200 includes a shaft 206, a magnet 204, a first sensing circuit 202, a first board 208, a second sensing circuit 202', and a second board 208'. As illustrated, two sensing circuits 202, 202' can be disposed around the one shaft 206. In another embodiment, the implementation can use an end-of-shaft configuration where the magnet can be a dipole magnet located at the end of the shaft and the sensing circuit 202, 202' can be located under the magnet. The implementation 200 is similar to the implementation 100 except that the implementation 200 comprises two sensing circuits 202, 202' and two board 208, 208' onto which the two sensing circuits 202, 202' are mounted, respectively. The implementation 200 can be an ePAS system and further comprise a motor (not illustrated). The first and the second sensing circuits 202, 202' can have a structure and functions similar to the sensing circuit 102 illustrated in FIGS. 2A, 3, 3A, 3B.

When the implementation 200 is the ePAS system, the ePAS system can comprise a motor having two sets of windings (e.g., a first set of windings and a second set of windings). The ePAS system can comprise two different controllers (e.g., a first controller and a second controller) that can drive the two sets of windings, respectively. The first and the second sensing circuits 202, 202' can be independently driven. The first sensing circuit 202 can be associated, for example, with the first controller. The second sensing circuit 202' can be associated, for example, with the second controller. The first controller can receive three data or angle information from the first sensing circuit 202 and the second controller can receive different three data or angle information from the second sensing circuit 202'. A first power supply can supply power to the first sensing circuit 202 and a second power supply can supply power to the second sensing circuit 202'. Thus, two independent channels, for example, a first channel (channel 1) comprising the first power supply, the first controller, and the first sensing circuit 202 and a second channel (channel 2) comprising the second power supply, the second controller, and the second sensing circuit 202', for detecting an error can be established. Thus, the implementation 200 can be designed to tolerate faults in each channel. Further, the motor control system can be augmented by permitting communication between the processors of each channel, such that each channel is provided the status of the other channel. Safety and control can be further increased by comparing the angle data between each of the paths on each of the channels. In an embodiment, the first controller and the second controller can comprise a processor that is similar to the processor 316, respectively.

The first controller can communicate with the second controller. The first controller can receive information related to signal processing paths and/or angles in the second channel. The second controller can receive information relate to signal processing paths and/or angles in the first route. For example, the first controller can receive one or more data or angle information from the second channel. When the three angle data or angle information from the first sensing circuit 202 in the first channel are different from each other, the second controller in the second channel can provide an agreement to the first controller to determine which data or angle information from the first channel is correct. For example, if the all of the angles on channel 1 mismatch, information from channel 2 may permit the system to remain operational by identifying the channel 1 path that provides accurate information. Table 3 outlines an example decision making process in the event of disagreement between three independent sensor measurement data on one channel of a two channel system.

TABLE 3

| Scenario | Angle Result | Cause | Action |
|---|---|---|---|
| 5a | Channel 1 Angle 1, Angle 2, Angle 3 all different. Channel 2 Angles agree with Channel 1 Angle 1 | No fault present on Channel 1 Signal Path 1 | Channel 1 Motor control proceeds using Angle 1 |
| 5b | Channel 1 Angle 1, Angle 2, Angle 3 all different. Channel 2 Angles agree with Channel 1 Angle 2 | No fault present on Channel 1 Signal Path 2 | Channel 1 Motor control proceeds using Angle 2 |
| 5c | Channel 1 Angle 1, Angle 2, Angle 3 all different. Channel 2 Angles agree with Channel 1 Angle 3 | No fault present on Channel 1 Signal Path 3 | Channel 1 Motor control proceeds using Angle 3 |

Figure 7:
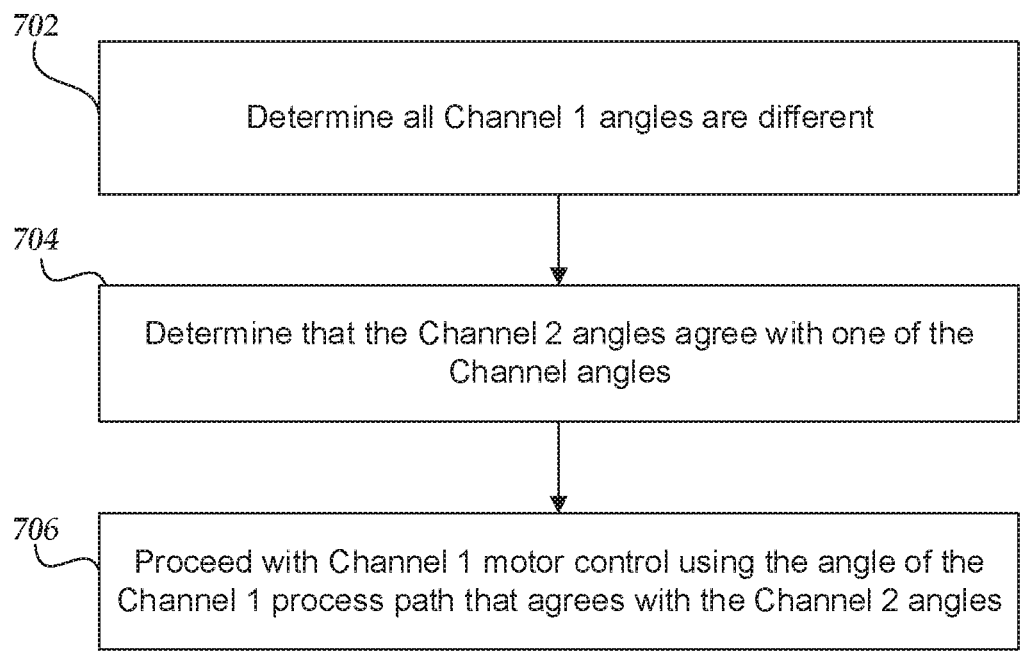
FIG. 7 is a flowchart of an example process of an error detection method according to certain embodiments.

FIG. 7 is a flowchart of an example process of an error detection method according to certain embodiments. The process can be performed with the circuit elements and the processor illustrated in FIGS. 2A, 3, 3A, 3B.

In block 702, it is determined that all angles in the first channel are different.

In block 704, it is determined that the second channel agrees with one of the angles from the first channel. For example, when none of the angle information of the first channel agree or agree within a threshold difference, the first controller can receive angle information of the second channel from the second controller and compare the angle information of the second channel with the angle information of the first channel. The first controller can determine which angle from the first channel is correct based on the comparison. For example, when the three angle data or angle information of the second channel match or match within a threshold difference, and match or match within a threshold difference with one of the angle data or angle information of the first channel, the first channel motor control can proceed using the angle data or angle information of the first channel that matches the angle data or angle information of the second channel.

In block 706, the first channel motor control proceeds using an angle of the first channel that agrees with the angles of the second channel.

Terminology

Aspects of this disclosure can be implemented in various electronic devices. Examples of the electronic devices can include, but are not limited to, consumer electronic products, parts of the consumer electronic products, electronic test equipment, vehicular electronics systems, etc. Examples of the electronic devices can include, but are not limited to, computing devices, communications devices, electronic household appliances, automotive electronics systems, etc. Further, the electronic devices can include unfinished products.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in the above Detailed Description of Certain Embodiments using the singular or plural number may also include the plural or singular number respectively.

Where the context permits, the word "or" in reference to a list of two or more items is intended to cover all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

As used herein, the term "determining" encompasses a wide variety of actions. For example, "determining" may include calculating, computing, processing, deriving, investigating, looking up (e.g., looking up in a Table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the implementations are not limited to the precise configuration and components illustrated above. Various modifications, changes and variations may be made in the arrangement, operation and details of the methods and apparatus described above without departing from the scope of the implementations.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

What is claimed is:

1. A magnetic angle measurement system comprising:
   a first magnetic angle sensor having a first plurality of outputs comprising a first subset of outputs and a second subset of outputs, wherein the first subset of outputs is a different combination of the first plurality of outputs from the second subset of outputs;
   a second magnetic angle sensor having a second plurality of outputs;
   a first signal processing circuitry in a first signal processing path, the first signal processing circuitry configured to receive the first subset of outputs from the first magnetic angle sensor and determine first magnetic angle data based on the received first subset of outputs;
   a second signal processing circuitry in a second signal processing path configured to receive the second subset of outputs from the first magnetic angle sensor and determine second magnetic angle data based on the received second subset of outputs;
   a third signal processing circuitry in a third signal processing path configured to receive the second plurality of outputs from the second magnetic sensor and determine third magnetic angle data based on the received second plurality of outputs; and
   a processor configured to compare the first, second, and third magnetic angle data and determine a processing result based on the comparison, wherein fault tolerance resolution of the magnetic angle measurement system is based at least in part on the processing result.

2. The magnetic angle measurement system of claim 1 wherein determining the processing result comprises determining agreement between two of the first, second, and third magnetic angle data.

3. The magnetic angle measurement system of claim 2 wherein the processing result comprises one of the two magnetic angle data in agreement.

4. The magnetic angle measurement system of claim 1 wherein the first, second, and third signal processing paths are independent paths.

5. The magnetic angle measurement system of claim 1 further comprising fault detection circuitry configured to monitor the first, second, and third signal processing paths for faults.

6. The magnetic angle measurement system of claim 5 wherein determining the processing result comprises determining no agreement between the first, second and third magnetic angle data and determining that the faults exist on two of the three signal processing paths.

7. The magnetic angle measurement system of claim 6 wherein the processing result comprises the magnetic angle data from the processing path not having the fault.

8. The magnetic angle measurement system of claim 1 further comprising:
   a third magnetic angle sensor having a third plurality of outputs and a fourth magnetic angle sensor having a fourth plurality of outputs;
   a fourth signal processing circuitry in a fourth signal processing path configured to determine fourth magnetic angle data based on a first subset of the third plurality of outputs from the third magnetic angle sensor;
   a fifth signal processing circuitry in a fifth signal processing path configured to determine fifth magnetic angle data based on a second subset of the third plurality of outputs from the third magnetic angle sensor; and
   a sixth signal processing circuitry in a sixth signal processing path configured to determine sixth magnetic angle data based on the fourth plurality of outputs from the fourth magnetic sensor, wherein the processor is further configured to determine the processing result based on the comparison and the fourth, fifth, and sixth magnetic angle data.

9. The magnetic angle measurement system of claim 8 wherein determining the processing result comprises determining no agreement between the first, second and third magnetic angle data and determining that the fourth, fifth, and sixth magnetic angle data agree with one of the first, second and third magnetic angle data.

10. The magnetic angle measurement system of claim 9 wherein the processing result comprises the one of the first, second and third magnetic angle data in agreement with the fourth, fifth, and sixth magnetic angle data.

11. A method for controlling a motor, the method comprising:
   obtaining a first data from a first signal processing path, a second data from a second signal processing path, and a third data from a third signal processing path, the first data and the second data being associated with a first sensor having a plurality of outputs comprising a first subset of outputs and a second subset of outputs, the first subset of outputs is a different combination of the plurality of outputs from the second subset of outputs, the first data being generated by the first subset of outputs and the second data being generated by the second subset of outputs, the third data being associated with a second sensor that is different from the first sensor, and the first, second, and third signal processing paths being independent of each other;

determining a first angle, a second angle, and a third angle from the first, the second, and the third data, respectively, comparing, with a processor, the first, second, and third angles; and controlling the motor based at least in part on the comparison.

12. The method of claim 11 wherein the controlling the motor based on the comparison comprises determining that two of the first, the second and the third angles match and controlling the motor using one of the two matching angles in response to the determining that two of the first, the second and the third angles match.

13. The method of claim 11 further comprising monitoring the first, second, and third signal processing paths to detect errors and causing an indication of an active fault flag in response to detecting the error, the active fault flag associated with the signal processing path having the detected error.

14. The method of claim 13 wherein the controlling the motor based on the comparison comprises determining that the first, second and third angles mismatch, determining that active fault flags are associated with two of the first, second, and third signal processing paths, and controlling the motor using the angle associated with the signal processing path not associated with the active fault flag in response to the determination that the active fault flag is associated with the two of the first, second, and third signal processing paths.

15. The method of claim 13 wherein the first sensor is an anisotropic magnetoresistive sensor and the second sensor is a tunneling magnetoresistive sensor.

16. The method of claim 11 further comprising:
obtaining a fourth data from a fourth signal processing path, a fifth data from a fifth signal processing path, and a sixth data from a sixth signal processing path, the fourth and the fifth data being associated with a third sensor, the sixth data being associated with a fourth sensor that is different from the third sensor, and the fourth, fifth, and sixth signal processing paths being independent of each other;

determining a fourth angle, a fifth angle, and a sixth angle from the fourth, the fifth, and the sixth data, respectively; and controlling the motor based on the comparison and the fourth, fifth, and sixth angles.

17. The method of claim 16 wherein controlling the motor comprises determining no agreement between the first, second and third angles and determining that the fourth, fifth, and sixth angles agree with one of the first, second and third angles.

18. A motor control system configured as part of a vehicle control system, the motor control system comprising:
a shaft in communication with a steering wheel of the vehicle; and
a magnetic angle measurement system for determining rotation of the shaft for motor control, the magnet angle measurement system including:
a first magnetic angle sensor having a first plurality of outputs comprising a first subset of outputs and a second subset of outputs, wherein the first subset of outputs is a different combination of the first plurality of outputs from the second subset of outputs;
a second magnetic angle sensor having a second plurality of outputs;
a first signal processing circuitry in a first signal processing path, the first signal processing circuitry configured to receive the first subset of outputs from the first magnetic angle sensor and determine first magnetic angle data based on the received first subset of outputs;
a second signal processing circuitry in a second signal processing path configured to receive the second subset of outputs from the first magnetic angle sensor and determine second magnetic angle data based on the received second subset of outputs;
a third signal processing circuitry in a third signal processing path configured to receive the second plurality of outputs from the second magnetic sensor and determine third magnetic angle data based on the received second plurality of outputs; and
a processor configured to compare the first, second, and third magnetic angle data and determine a processing result based on the comparison, wherein the motor control is based at least in part on the processing result.

19. The motor control system of claim 18 wherein determining the processing result comprises determining agreement between two of the first, second, and third magnetic angle data.

20. The motor control system of claim 19 wherein the processing result comprises one of the two magnetic angle data in agreement.

* * * * *